Feb. 21, 1950     D. B. GARDINER     2,498,543
POWER TRANSMISSION

Filed Jan. 25, 1947     3 Sheets-Sheet 1

INVENTOR.
DUNCAN B. GARDINER
BY Ralph L. Tweedale
ATTORNEY

Feb. 21, 1950     D. B. GARDINER     2,498,543
POWER TRANSMISSION

Filed Jan. 25, 1947     3 Sheets-Sheet 2

INVENTOR.
DUNCAN B. GARDINER
BY Ralph L. Tweedale
ATTORNEY

INVENTOR.
DUNCAN B. GARDINER
BY Ralph L. Tweedale
ATTORNEY

Patented Feb. 21, 1950

2,498,543

UNITED STATES PATENT OFFICE 2,498,543

POWER TRANSMISSION

Duncan B. Gardiner, Detroit, Mich., assignor to Vickers Incorporated, Detroit, Mich., a corporation of Michigan Application January 25, 1947, Serial No. 724,443

11 Claims. (Cl. 60—52)

This invention relates to power transmissions, particularly to those of the type comprising two or more fluid pressure energy translating devices, one of which may function as a pump and another as a fluid motor.

The invention is more particularly concerned with a hydraulic power transmission system designed for imparting a reciprocating movement to a slide or table such as is used for instance on grinders. In hydraulic transmissions of this type, a continuous reciprocating movement is imparted to the table or slide upon which the work element or the tool element is carried until the work is ground to the required size. It is customary to provide means for controlling the speed of the table, for controlling the stroke length and for automatic reversal at each end of the stroke. In addition, means may be provided for controlling the acceleration and deceleration of the slide at the start and end of each stroke.

It is an object of the present invention to provide a power transmission system of the type particularly adapted for operating grinders and having an improved means for controlling the deceleration and acceleration at reversal of the hydraulically actuated slide or table.

It is a further object of the present invention to provide a unitary control panel for use in hydraulic power transmissions of the above type wherein is incorporated a minimum of control valves for providing continuous reciprocating strokes of the table or slide, controlled speed of the stroke, automatic reversal at each end of the stroke, and controlled acceleration and deceleration at the start and end of each table stroke.

Further objects and advantages of the present invention will be apparent from the following description, reference being had to the accompanying drawings wherein a preferred form of the present invention is clearly shown.

Figure 6:
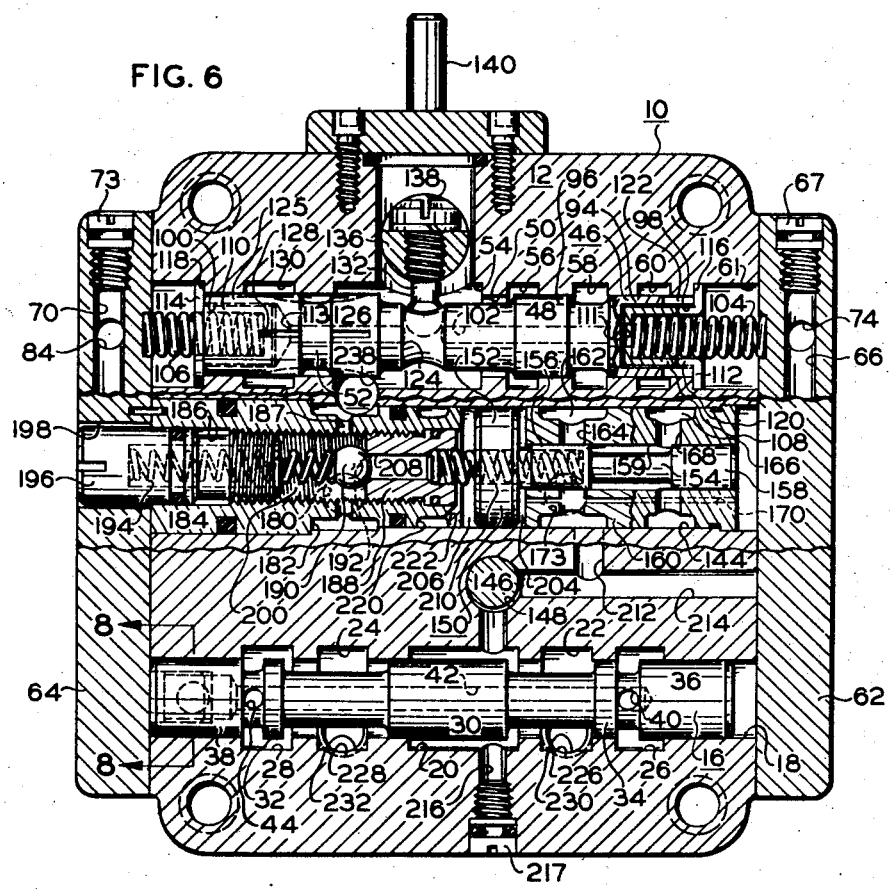
Figure 6 is a view taken from line 6—6 of Figure 3.
Figure 9:
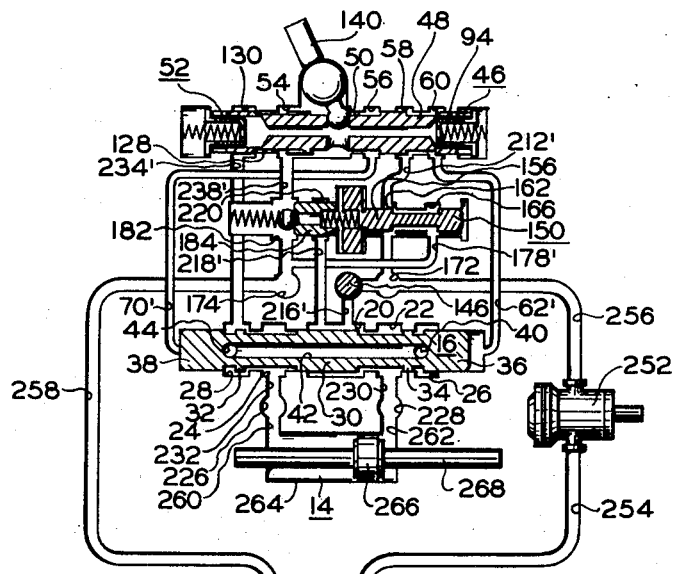
Figure 9 is a diagrammatic view illustrating the circuit of the panel together with the associated elements of a complete power transmission system showing the parts in position during operation.
Figure 10:
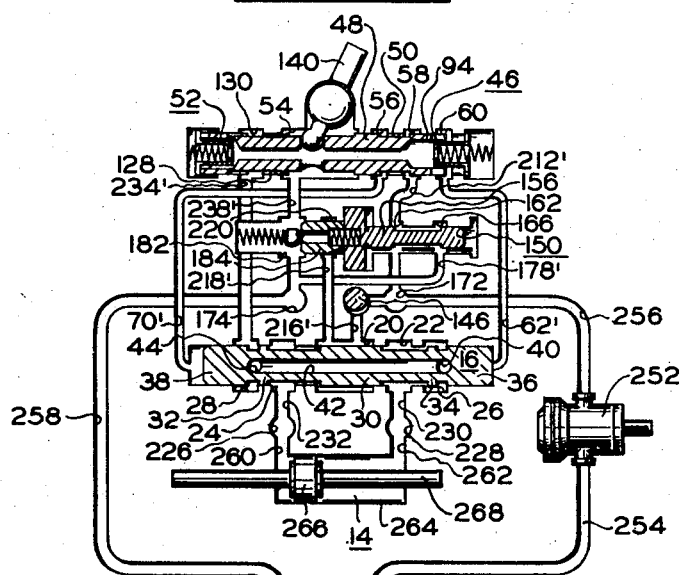
Figure 10 is a view corresponding to Figure 9, but showing the parts in another position during operation.

Referring now to Figure 6, there is shown a unitary control panel 10 comprising a body 12 within which is mounted all of the valving mechanism necessary for controlling the automatic reversal, speed and acceleration and deceleration of a fluid motor 14 shown in Figures 9 and 10, the latter of which is adapted to drive a grinder table or slide, not shown. For the purpose of controlling the directional movement of the motor 14, a reversing valve 16 is reciprocably mounted in a longitudinal bore 18 extending completely across the body 12. The bore 18 is provided with a centrally located groove forming a pressure port 20, with grooves on the right and left side of groove 20 which, respectively, form motor ports 22 and 24 and with grooves spaced apart from the motor ports forming tank ports 26 and 28. The reversing valve 16 is provided with a large centrally located land 30 which cooperates with lands 32 and 34 spaced apart from land 30 on the left and right side thereof, respectively, for alternately connecting the pressure port 20 and tank port 28 to the cylinder ports 22 and 24. The valve 16 is also provided with extreme right and left end lands 36 and 38, respectively, which acts as guides for the valve 16. The valve 16 is also provided with a plurality of transverse ports 40 located between lands 34 and 36 which are connected by means of a longitudinal passage 42 within the valve 16 to another plurality of transverse ports 44 located between lands 32 and 38. Thus, with valve 16 shifted completely to the right, fluid returning from the motor 14 to the cylinder port 22 is directed through the cooperation of lands 30 and 34 to the tank port 26 and from the tank port 26 to the tank port 28 by means of transverse ports 40, longitudinal passage 42 and transverse ports 44.

The reversing valve 16 is adapted to be actuated hydraulically under the control of a pilot valve 46, the latter of which is formed on one part of a spool 48 reciprocably mounted in a longitudinal bore 50 extending completely across the body 12. Formed on the left side of the spool 48, so as to be reciprocable with pilot valve 46, is a combined acceleration and deceleration valve 52. The bore 50 is provided with a large centrally located groove forming a tank port 54 and spaced apart grooves to the right thereof forming ports 56, 58, 60, and 61, the latter of which forms an extreme right end chamber. Port 56 is connected to the left end of bore 18 containing reversing valve 16, port 60 is connected to the right end thereof and port 58 is adapted to be continuously connected to a source of pressure fluid. It is the function of the pilot valve 46 to alternately connect the pressure port 58 and the tank port 54 to the ports 56 and 60 so as to shift reversing valve 60 rightwardly or leftwardly near the end of each motor stroke to reverse the directional movement of the motor. For this purpose, plates 62 and 64 are respectively suitably bolted to the right and left sides of the body 12 containing passages which cooperate with passages constructed in the body 12 in the following manner.

Figure 1:
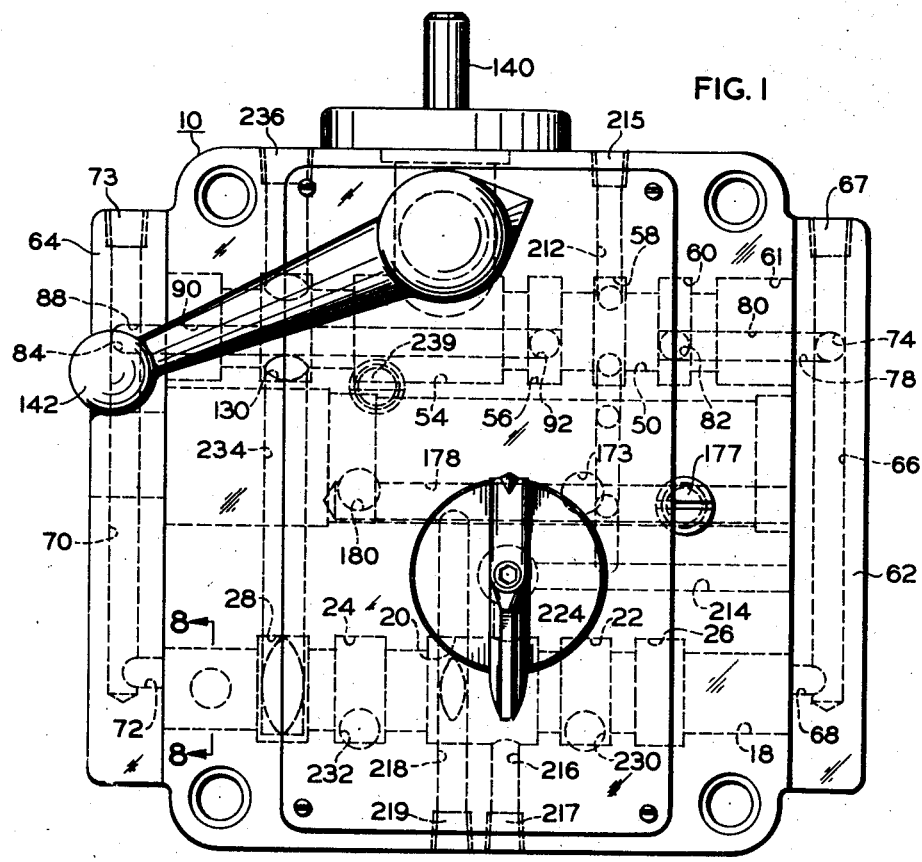
Figure 1 is a sectional view of a preferred form of the present invention.
Figure 2:
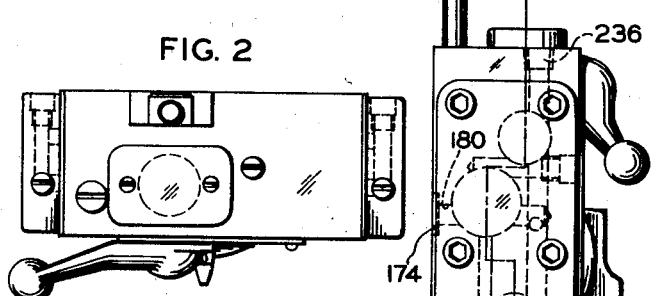
Figure 2 is a top view of the present invention.

Referring now to Figures 1 and 6, the right plate 62 is provided with a vertical passage 66 closed at its upper end by a suitable plug 67. The passage 66 terminates at a point of intersection with a horizontal passage 68 which is adapted to register with the right end of bore 18. The left side plate 64 is also provided with a vertical and a horizontal passage 70 and 72, respectively, the latter of which is adapted to register with the left end of bore 18 while the open end of the former is closed by a suitable plug 73.

Figure 7:
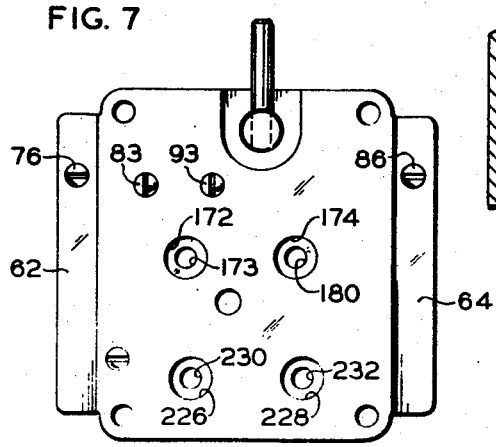
Figure 7 is a rear view of the present invention.

For the purpose of connecting vertical passage 66 to the groove forming port 60, a passage 74 is constructed from the rear of the right plate 62 which intersects vertical passage 66 and which is closed at its open end by a plug 76 shown in Figure 7. A horizontal passage 78 in plate 62 intersecting passage 74 is adapted to register with a longitudinal passage 80 in the body 12 constructed from the right side thereof which intersects a passage 82 constructed from the rear of body 12. The passage 82 intersects the groove forming port 60. As shown in Figure 7, the open end of passage 82 is closed at the rear end of body 12 by a plug 83.

For the purpose of connecting the groove forming port 56 to the left end of bore 18, a passage 84 is constructed from the rear of the left plate 64 which intersects vertical passage 70 and which is closed at its open end by a plug 86 shown in Figure 7. A horizontal passage 88 in the left plate 64 intersecting passage 84 is adapted to register with a longitudinal passage 90 constructed from the left side of body 12. The passage 90 intersects a passage 92 constructed from the rear of body 12 which intersects the groove forming port 56. As shown in Figure 7, the open end of passage 92 is closed at the rear of the body 12 by means of the plug 93.

Referring now to Figure 6, the pilot valve portion 46 of spool 48 is provided with an extreme right end land 94 and a land 96 to the left thereof and spaced apart therefrom. The spool 48 is provided with enlarged bores at the extreme right and left ends thereof indicated by the numerals 98 and 100 which are connected to each other by a longitudinal passage 102 in said spool. The spool 48 is normally maintained in the center position shown in Figure 6 by means of duplicate springs 104 and 106, a portion of each of which is mounted in right and left end, hollow and cup- shaped spring retainers 108 and 110, the latter of which are mounted in the enlarged bores 98 and 100 of spool 48. The right and left end spring retainers are provided, respectively, with a port 111 and a port 113 adapted to register with longitudinal passage 102. The retainers 108 and 110 are provided with flanges 112 and 114, respectively, which are, respectively, adapted to abut shoulders 116 and 118 in order to normally center the spool 48 within the bore 50. The opposite ends of the springs 104 and 106 are mounted in bores provided for that purpose in the right and left end plates 62 and 64.

As shown in Figure 6, the right spring retainer 108 is provided with a plurality of slots 120 which in the position shown, or when spool 48 is shifted leftwardly, registers with a plurality of flats 122 constructed in and near the end of spool 48 to form a means of communication between the groove forming port 60 and the extreme right end chamber 61. When spool 48 is shifted rightwardly, the retainer 108 is also shifted rightwardly by the spool 48 and the slot 120 and the flats 122 shift out of registry with the groove 60 to close communication between the groove 60 and the extreme right end groove of the bore 50 forming chamber 61.

The spool 48 is also provided with a centrally located transverse bore 124 extending through the spool which connects the longitudinal passage 102 with the enlarged centrally located groove of the bore forming tank port 54. Thus, upon spool 48 shifting rightwardly or leftwardly, the corresponding extreme ends of the bore 50 are placed in communication with the tank port 54 to permit proper shifting of the spool 48. It should also be noted that in the center position of the spool 48 not only are the extreme ends of the bore 50 in communication with tank port 54 but also the opposite ends of bore 18.

The left end portion of spool 48 forming the acceleration and deceleration valve 52 is constructed with an extreme left end land 125, a land 126 spaced apart therefrom to the right thereof, and a plurality of notches 128. The notches 128 control the flow of fluid from a groove in the bore 50 forming a return port 130 to the tank port 54. As will hereinafter be described, all fluid discharged from either end of the motor 14 must pass through the return port 130 and the tank port 54. When the spool 48 is shifted rightwardly from the center position near the end of one motor stroke, the left end of the notches 128 will gradually pass over the return port 130 to gradually restrict the flow of fluid from the motor and decelerate the same. When the spool 48 is shifted from the center position to the left near the end of the opposite motor stroke, the right end of the notches 128 gradually will pass over the tank port 54 to gradually restrict the flow of fluid from the motor 14 and decelerate same. In addition, the notches 128 of the acceleration and deceleration valve 52 and the lands 94 and 96 of the pilot valve 46 are so arranged on the spool 48 that, just before the return port 130 or the tank port 54 would be closed, the pilot valve 46 reverses the connections to the reversing valve spool 16 to reverse the direction of the motor 14. Upon reversal of the motor 14, the spool 48 is designed to follow the reverse stroke of the motor 14 until centered so that the return or tank port, i. e., whichever port was gradually closed to decelerate the motor 14, will be gradually reopened to the discharge from the opposite end of the motor to smoothly accelerate the latter. When the spool 48 is centered, as shown in Figure 6, the notches 128 permit free flow of fluid from the return port 130 to the tank port 54.

The spool 48 is adapted to be actuated near each end of the motor stroke by the usual table dog arrangement (not shown) in the well-known manner. For this purpose, a ball-ended rod 132 fits into the bore 124 of the spool 48 and is secured to a rotatable shaft 136 which is mounted in a bore 138 extending completely through the body 12 from the rear to the front thereof. A lever arm 140 adapted to be contacted by the dogs associated with the sliding table is pivotally connected to the shaft 136 for reciprocation of the latter. Connected to the portion of the shaft 136 which extends from the front of the body 12 is a lever 142 (Figure 1) for manual operation of the valve spool 48 during set-up and for stopping the motor during operation of the grinding process. As previously stated, during normal operation of the grinding process, the return or tank port is never completely closed. However, it may be clearly seen that, if the spool 48 was manually shifted by the lever 142 to completely close the return or tank port, discharge flow from the motor 14 would be blocked and the motor would stop.

Suitably mounted in a bore 144 constructed completely across the body 12, but on a different plane than bores 18 and 50, is control valve mechanism for maintaining a constant pressure drop across a throttle 146 mounted in a bore 148 extending from the front to the rear of the panel 10.

The control valve mechanism consists of a compensating valve 150 comprising a piston 152 reciprocably mounted in the bore 144, said piston being provided with a stem 154 connected thereto having two lands 156 and 158. The stem 154 is reciprocable in a bore 159 of a sleeve 160 mounted in the bore 144.

The sleeve 160 is provided with an annular port 162 and a passage 164 connecting said port to the bore 159 and spaced apart therefrom an annular port 166 and a passage 168 which connects the port 166 to the bore 159. A passage 170 extending completely lengthwise through the sleeve 160 intersects passage 164 but not passage 168.

Figures 3, 4:
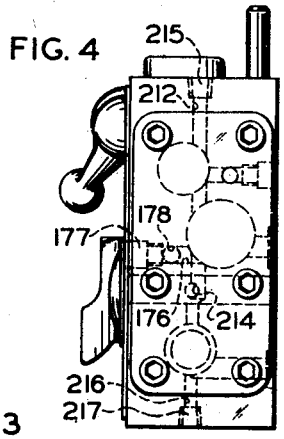
Figure 3 is a left side view of the present invention.
Figure 4 is a right side view of the present invention.
Figure 5:
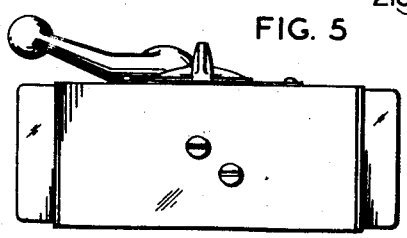
Figure 5 is a bottom view of the present invention.

The port 162 is directly connected to an external connection pressure port 172 located in the rear of the body 12 by means of a passage 173. The port 166 is connected to an externally located tank port 174 in the rear of the body 12 by means of a passage 176 constructed from the front of the body (Figure 4), the open end of which is closed by a plug 177 (Figure 1). The passage 176 intersects a passage 178 constructed from the right side of the body 12, the latter passage of which intersects a passage 180 connected to external tank port 174. The passage 180 also connects the external tank port 174 with an annular port 182 formed in a sleeve 184 mounted in bore 144. The sleeve 184 has a longitudinal bore 186, the latter of which is connected to the port 182 by a passage 187.

The bore 186 is threaded near its right end for the reception of a seat member 188 for a pilot relief valve 190. The pilot relief valve 190 is normally maintained on a seat 192 formed in the seat member 188 by means of a spring 194 of predetermined resistance mounted in the opposite end of bore 186, the latter of which is also threaded for the reception of an adjusting screw 196. The left side plate 64 contains a bore 198 adapted to register with the bore 186 of sleeve 184 so that the resistance of the spring 194 may be changed by adjusting screw 196 without removing the side plate 64. The passage 187 in the sleeve 184 connects the port 182 to an exhaust chamber 200 formed in bore 186 between the right end of the adjusting screw 196 and the seat member 188.

The piston 152 of compensating valve 150 is adapted to be responsive to pressure ahead of the throttle in a chamber 204 formed in the bore 144 between the left end of sleeve 160 and the right side of piston 152. The piston 152 is adapted to be responsive to pressure beyond the throttle in a chamber 206 formed in the bore 144 between the left side of piston 152 and the right end of the seat member 188. The chamber 206 is in communication with the pilot relief valve 190 by means of a bore 208 extending through the seat member 188 at the extreme left end of which is formed the seat 192. Thus, upon a predetermined pressure arising in the system as determined by the resistance of spring 194, the valve 190 will be shifted to connect chamber 206 to exhaust chamber 200, and a differential pressure will be created in the chamber 204 and 206. The greater pressure existing in chamber 204 is sufficient to shift the compensating valve 150 against the slight resistance of a spring 210 biasing the compensating valve 150 to the closed position, and land 156 will open fully the port 162 to port 166 so as to relieve all pressure fluid to the external tank port 174. Whenever the pressure in the system is below the setting of spring 194, the resistance of the spring 210 of compensating valve 150 will determine the pressure drop across the throttle 146.

The pressure ahead of the throttle is existent in chamber 204 by means of the pressure port 172, the pressure passage 173, and the groove 162, passage 164 and passage 170 of sleeve 106.

Pressure beyond the throttle 146 is in communication with chamber 206 in the following manner: The pressure groove 162 of the compensating valve 150 is connected to the throttle bore 148 by means of a passage 212 constructed from the top of the body 12 and which extends downwardly to a point of intersection with a passage 214 constructed from the right side of body 12 and which intersects the throttle bore 148. The vertical passage 212 which is closed at its upper end by a plug 215 also intersects the pressure port 58 controlled by pilot valve 46 and the port 162 formed in sleeve 160. It should be noted that in this manner pressure fluid entering the external pressure port 172 is not only delivered to the throttle 146, but also to the compensating valve 150 where it has an influence on piston 152 within chamber 204 and also is delivered to the pressure port 58 of pilot valve 46 from where the pilot valve 46 may direct the same to either end of the reversing valve. From the throttle bore 148, pressure fluid is directed to the chamber 206 of compensating valve 150 by means of a passage 216 constructed from the bottom of body 12 which intersects the pressure port 20 of reversing valve 16 and is connected to the throttle bore 148. A passage 218 constructed from the bottom of body 12 also intersects the pressure port 20 and is connected to a port 220 formed in the sleeve 184. The port 220 is connected to chamber 206 by means of a passage 222 in the sleeve member 184. The passages 216 and 218 are closed at their open ends by plugs 217 and 219. The flow through throttle 146 may be regulated by means of a manually operated dial 224 suitably connected to the throttle as shown in Figure 1. The two motor ports 22 and 24 are respectively directly connected to the externally located motor ports 226 and 228 in the rear of the body 12, respectively, by means of passages 230 and 232.

The reversing valve 16 is designed to always direct fluid discharging from either end of the motor 14 to the return port 130 of the acceleration and deceleration valve 52. For this purpose a vertical passage 234 is constructed from the top of the body 12 which intersects port 130 of valve 52 and continues to a point of intersection with the tank port 28 of reversing valve 16. The passage 234 intersects the groove 130 of bore 50, but does not intersect bore 144 and is closed at its open end by a plug 236 (Figure 1).

For the purpose of directing fluid to the external tank port 174 from the groove 130 and groove 54 of bore 50, a passage 238 is constructed from the front of the body 12 which intersects the groove 54 forming the main tank port of bore 50 and also intersects the groove forming the annular port 182 of sleeve 184. As the passage 180 is connected to the external tank port 174 and intersects port 182 of sleeve 184, it may be clearly seen that fluid is directed from the tank port 54 to the external tank port 174 by means of passage 238, port 182 of sleeve 184, and passage 180. The passage 238 is closed at its open end by means of a plug 239.

Figure 8:
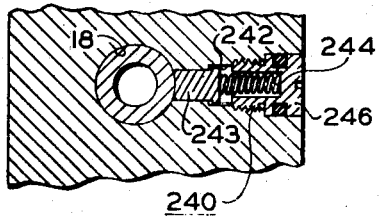
Figure 8 is a view taken from line 8—8 of Figure 6 and Figure 1.

Due to the fact that the spool 48 returns to a centrally located position after the reversing valve has shifted completely to reverse the direction of the motor 14, both ends of bore 18 containing the reversing valve 16 will be connected to the external tank port 174. Because of the absence of pressure at one end or the other of the bore 18 to maintain the reversing valve 16 in the position last shifted to, a friction pad indicated generally by the numeral 240 and shown more clearly in Figure 8 is provided to perform this function. The assembly 240 which is mounted in a bore 242 extending from the rear of the body 12 and which intersects the left end of the bore 18 comprises a chamfered piston 243 adapted to frictionally engage the left end of valve 16 by means of a spring 244 of slight resistance mounted in a plug 246 which is threaded into bore 242.

Referring now to Figures 9 and 10, these diagrams represent the internal circuit of the panel 10 together with the other elements of a typical hydraulic power transmission system. Thus, there is represented a tank 250 and a pump 252 having a suction conduit 254 and a delivery conduit 256, the latter of which is connected to the external pressure port 172 of the panel 10. The external tank port 174 is connected to the tank 250 by means of a conduit 258. The external motor ports 226 and 228 are connected to the opposite ends of the motor 14 by means of conduits 260 and 262. The motor 14 comprises a cylinder 264 within which is reciprocably mounted a piston 266 which is connected to a piston rod 268 extending from both ends of the cylinder 264. The motor 14 is adapted to drive a grinder table having dogs associated therewith (not shown) for contacting the lever arm 140 at each end of the table stroke.

The internal circuit of the panel for purposes of convenience is illustrated in the following manner. The right and left ends of the reversing valve 16 are respectively connected to the ports 60 and 56 of the pilot valve 46 by means of conduits 62' and 70'. A conduit 234' connects the return port 130 of the valve 52 to the tank port 28 of reversing valve 16 and a conduit 238' connects the tank port 54 of bore 50 to the external tank port 174 and to the exhaust port 182 of the relief valve mechanism. A conduit 212' connects the external pressure port 172 to the port 162 of compensating valve 150 and also to the port 58 of pilot valve 46. A conduit 216' connects the throttle 146 to the external pressure port 172 and also to the pressure port 20 of reversing valve 16. A conduit 218' connects the port 220 of the sleeve member 184 to the pressure port 20 of reversing valve 16, and a conduit 178' connects the port 166 of compensating valve 150 to the passage 238'. The external motor ports 226 and 228 are respectively connected to the ports 24 and 22 of the reversing valve 16 by means of conduits 232 and 230.

In operation, with the parts in the position illustrated in Figure 9, the panel is set for a stroke of the motor piston 266 in the leftward position. Near the completion of the rightward motor stroke, lever arm 140 was contacted and the spool 48 shifted rightwardly to the position shown. During the shifting of the spool 48 rightwardly, the notches 128 of the acceleration and deceleration valve 52 gradually passed over the return port 130 so as to gradually restrict the flow of fluid discharging from the motor through conduit 262. By gradually restricting the flow of fluid discharging from the motor 14, the latter was smoothly decelerated.

Just before the return port 130 was completely closed by the notches 128 passing completely over said port, the land 94 of pilot valve 46 opened communication between the pressure port 58 thereof to the groove forming port 60. Port 60 is connected to the right end of the reversing valve 16 and said valve immediately and quickly shifted leftwardly because the left end of the reversing valve is directly connected to the tank 250. Fluid displaced from the left end of the reversing valve 16 was directed to the tank 250 by means of conduit 70', port 56 of pilot valve 46, tank port 54, conduit 238', external tank port 174, and conduit 258. The reversing valve 16 by means of lands 30 and 34 immediately directed fluid to the right end of motor 14 to reverse the direction thereof.

As the motor 14 reverses its stroke, the lever 140 remains in contact with the table dog, not shown, and the fluid now discharging from the left end of the motor 14 must be discharged to tank 250 through the return port 130 and tank port 54 spaced along bore 50. As previously stated, the port 130 had almost been closed by the notches 128 passing over the port 130 when the connections to the motor 14 were changed to reverse the direction of said motor. Consequently, as the lever 140 follows the dog on the return stroke of the motor, the notches 128 gradually reopen the return port 130 to gradually permit an increase in flow discharging from the motor to smoothly accelerate the same. Fluid discharging from the left end of the motor 14 is returned to tank 250 by means of conduit 260, external port 226, passage 232, ports 24 and 28 of reversing valve 16, passage 234', ports 130 and 54 of valve 52, passage 238', external tank port 174 and conduit 258. When the spool 48 has returned to the center position shown in Figure 6, the dog will lose contact with the lever 140 and the speed of the motor 14 will be regulated by the throttle 146 and compensating valve 150 in the well-known manner.

The compensating valve 150 is adapted to maintain a constant pressure drop across the throttle 146 by being responsive to the pressure ahead of and beyond the throttle 146. Any tendency to create a pressure drop greater than the resistance of spring 210 is immediately reflected in chamber 204 causing the piston 152 to shift leftwardly and resulting in land 156 opening communication to port 162. The port 162 is opened to port 166 so that an amount of fluid will be exhausted to the tank 252 sufficient to maintain the pressure drop across the throttle 246 uniformly constant.

If at any time the pressure within the system increases to a value determined by the resistance of spring 194, relief valve 190 will be shifted to connect chamber 206 to the tank 250 causing a differential pressure to be created in the chambers 204 and 206 on opposite sides of the piston 152. This differential pressure results in piston 152 shifting completely to the left, and the complete flow of excessive pressure fluid from the pump 252 will be exhausted through the compensating valve 150 to the tank 250.

When the piston 266 of motor 14 nears the end of its leftward stroke, the lever 140 will be contacted by another dog, not shown, to shift the spool 48 leftwardly and, instead of the return port 130 gradually being closed to discharging flow from the motor 14 as on the opposite stroke of the motor, the tank port 54 will gradually be closed by the land 126 and notches 128. As the spool 48 is shifted leftwardly, the notches 128 will gradually pass over the tank port 54 and fluid discharging from the left side of motor 14 will gradually be restricted to smoothly decelerate the motor. Any excess of fluid delivered by the pump 252 is exhausted to tank 250 by means of the compensating valve 150.

Just before the notches 128 pass completely over the tank port 54, the land 96 of pilot valve 46 will open communication between pressure port 58 and groove 56 which will permit pressure fluid to be directed by means of passage 70' to the left end of the reversing valve 16 to shift the same rightwardly. Fluid discharging from the right end of reversing valve 16 will be freely discharged to tank 250 by means of passage 62', groove 60, the flats 122 in spool 48 and the slots 120 of the right spring retainer 108 from where fluid is directed to the interior of the retainer 108 through the port 111. From the retainer 108 the fluid flows through longitudinal passage 102, central bore 124 of spool 48, tank port 54, passage 238', external tank port 174, and conduit 258 to the tank 250.

The reversing valve 16 will now connect the pressure port 20 thereof to the cylinder port 24 thereof, and pressure fluid will be directed from there by means of passage 232, external motor port 226, and conduit 260 to the left end of the motor 14. As the motor 14 reverses its directional movement, the lever 140 will follow the dog not shown until the spool 48 is again centered.

It should be noted that the motor 14 will be smoothly accelerated by reason of the discharging fluid therefrom being gradually permitted to increase in volume. This is accomplished by the notches 128 gradually opening up the tank port 54 to the return port 130. Fluid discharging from the right end of the motor 14 is directed to the tank 250 by means of conduit 262, external motor port 228, passage 230, motor port 22, and groove 26 of reversing valve 16, the ports 40, longitudinal passage 42, and ports 44 of the reversing valve spool, port 28, passage 234', ports 130 and 54 of the valve 52, passage 238', external tank port 174, and conduit 258.

Thus, it should be noted that the valve 52 is designed to both accelerate and decelerate the motor 14. The panel is so designed that all fluid discharging from the motor must discharge to the tank through the return and tank ports, both of which are controlled by the acceleration and deceleration valve. On one stroke of the motor, the return port is slowly closed to decelerate the motor. Just before the return port is completely closed, the pilot valve will reverse the connections to the reversing valve and the reversing valve will reverse the direction of the motor. As the motor reverses its stroke, the return port is gradually reopened by the notches in the valve to smoothly accelerate the motor. As the motor nears the end of this latter stroke, the deceleration and acceleration valve will, by means of the notches in the spool, slowly close the tank port to discharging fluid from the motor and decelerate the same. Before the tank port is completely closed, the pilot valve will reverse the connections to the reversing valve and the latter will shift to reverse the direction of the motor. As the motor reverses its stroke, the tank port will gradually be reopened by the notches of the valve and the motor will be smoothly accelerated.

Thus, the acceleration and deceleration of the hydraulically actuated motor is accomplished in a novel manner without the use of adjustable orifices or adjustable valve travel which have been used in the past to control reversal speed.

In addition, the panel contains a minimum of valvular mechanism which in addition to the above provides for automatic reversal and controlled speed of the motor, and also provides maximum safe pressure protection.

While the form of embodiment of the invention as herein disclosed constitutes a preferred form, it is to be understood that other forms might be adopted, all coming within the scope of the claims which follow.

What is claimed is as follows:

1. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, a motor return connection, and a single valve means shiftably mounted within the body for automatically gradually closing said connection near the end of a motor stroke to decelerate the motor and for automatically gradually reopening the same connection on the opposite stroke of the motor to accelerate the latter.

2. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, a motor return connection, and a single valve means mechanically associated with the pilot valve shiftably mounted within the body for automatically gradually closing said connection near the end of a motor stroke to decelerate the motor and for automatically gradually reopening the same connection on the opposite stroke of the motor to accelerate the latter.

3. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, a motor return connection, and a single valve means mechanically associated with the pilot valve shiftably mounted within the body for automatically gradually closing said connection near the end of a motor stroke to decelerate the motor and for automatically gradually reopening the same connection to accelerate the motor after the reversing valve has shifted completely to reverse the direction of the motor.

4. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, control valve mechanism within the body for controlling the speed of the motor, a motor return connection, and a single valve means shiftably mounted within the body for automatically gradually closing said connection near the end of a motor stroke to decelerate the motor and for automatically gradually reopening the same connection on the opposite stroke of the motor to accelerate the latter.

5. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, control valve mechanism within the body for controlling the speed of the motor, a motor return connection, and a single valve means mechanically associated with the pilot valve shiftably mounted within the body for automatically gradually closing said connection near the end of a motor stroke to decelerate the motor and for automatically gradually reopening the same connection on the opposite stroke of the motor to accelerate the latter.

6. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, control valve mechanism within the body for controlling the speed of the motor, a motor return connection, and a single valve means mechanically associated with the pilot valve shiftably mounted within the body for automatically gradually closing said connection near the end of a motor stroke to decelerate the motor and for automatically gradually reopening the same connection to accelerate the motor after the reversing valve has shifted completely to reverse the direction of the motor.

7. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, control valve mechanism mounted within the body for controlling the speed of the motor including an adjustable throttle and a compensating valve for maintaining a constant pressure drop across the throttle, a motor return connection, and a single valve means shiftably mounted within the body for automatically gradually closing said connection near the end of a motor stroke to decelerate the motor and for automatically gradually reopening the same connection on the opposite stroke of the motor to accelerate the latter.

8. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, control valve mechanism mounted within the body for controlling the speed of the motor including an adjustable throttle and a compensating valve for maintaining a constant pressure drop across the throttle, pressure responsive valve means associated with the compensating valve for causing the compensating valve to also perform the function of a relief valve, a motor return connection, and a single valve means shiftably mounted within the body for automatically gradually closing said connection near the end of a motor stroke to decelerate the motor and for automatically gradually reopening the same connection on the opposite stroke of the motor to accelerate the latter.

9. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, a motor return connection, and a spring centered single valve means shiftably mounted within the body adapted to be shifted in opposite directions from the center position thereof by the motor for automatically gradually closing said connection near the end of a motor stroke to decelerate the motor and for automatically gradually reopening the same connection on the opposite stroke of the motor to accelerate the latter.

10. A unitary control panel for use in a hydraulic power transmission having a fluid pump and reversible fluid motor, said panel comprising in combination a body having external connections for pressure supply and exhaust and two external motor connections, and said body having mounted therein a reversing valve for alternately connecting the pressure and exhaust connections to the two motor connections, a pilot valve for controlling the reversing valve, and a single valve means including a motor return connection in communication with the external exhaust connection for automatically gradually closing the return connection near the end of a motor stroke to decelerate the motor and for automatically gradually reopening the return connection on the opposite stroke of the motor to accelerate the latter, said pilot valve and valve means being mechanically connected, spring biased to the center position and adapted to be simultaneously shifted in opposite directions past the center position thereof by the motor near the end of each stroke of the latter.

11. A unitary control panel for use in a hydraulic power transmission having a fluid pump and reversible fluid motor, said panel comprising in combination a body, a reversing valve shiftably mounted therein for reversing the flow of fluid to and from the motor, a pilot valve shiftably mounted therein adapted to be actuated in opposite directions by the motor for controlling the reversing valve, a motor return connection, and a spring centered single valve means mechanically associated with the pilot valve and shiftably mounted within the body so as to be reciprocal simultaneously with the pilot valve for automatically gradually closing said connection near the end of a motor stroke to decelerate the motor and for automatically gradually reopening the same connection on the opposite stroke of the motor to accelerate the latter.

DUNCAN B. GARDINER.

REFERENCES CITED

The following references are of record in the file of this patent:

UNITED STATES PATENTS

| Number | Name | Date |
| --- | --- | --- |
| 610,479 | Ewart | Sept. 6, 1898 |
| 2,012,273 | Fraser | Aug. 27, 1935 |
| 2,267,177 | Twyman | Dec. 23, 1941 |